United States Patent

Riera et al.

[11] Patent Number: 5,076,125
[45] Date of Patent: Dec. 31, 1991

[54] ROTARY ARC RAM

[76] Inventors: John F. Riera, 3689 Sandburg Dr., Troy, Mich. 48084; Billy J. Bielawski, Sr., 2270 Flanders Dr., Rochester Hills, Mich. 48063; John J. Pavelec, 413 Dalton, Rochester, Mich. 48063

[21] Appl. No.: 378,129
[22] Filed: Jul. 11, 1989
[51] Int. Cl.⁵ .............................................. B23D 26/05
[52] U.S. Cl. ........................................ 83/285; 83/632; 83/700
[58] Field of Search .................. 83/285, 628, 630, 632, 83/633, 700

[56] References Cited

U.S. PATENT DOCUMENTS

| 3,273,433 | 9/1966 | Borzym | 83/54 |
| 3,288,011 | 11/1966 | Borzym | 83/310 |
| 3,288,012 | 11/1966 | Borzym | 83/310 |
| 3,745,868 | 6/1990 | Prentic | 83/630 |
| 4,031,792 | 6/1977 | Borzym et al. | 83/601 |
| 4,228,706 | 10/1980 | Borzym | 83/320 |
| 4,354,409 | 10/1982 | Riera et al. | 83/285 |

Primary Examiner—Mark Rosenbaum
Assistant Examiner—Rinaldi Rada
Attorney, Agent, or Firm—Harness, Dickey & Pierce

[57] ABSTRACT

A tube cutoff apparatus includes a parallelogram link assembly and a rotary arc ram which orbits 360° to maximize the vertical workstroke of the ram relative to the apparatus and has a lower inertia whereby to cut tubes of increased diameter, increase the ram length while decreasing the power required to drive the ram, and increase the driving response. The ram includes separated guide tracks with each track including a slide member that is disposed for sliding movement therein, the guide tracks defining wear plates and the slide members being connected to pairs of links. In one embodiment, two slide members are interconnected by a link plate, preferably by connecting to the individual pivot pins.

26 Claims, 4 Drawing Sheets

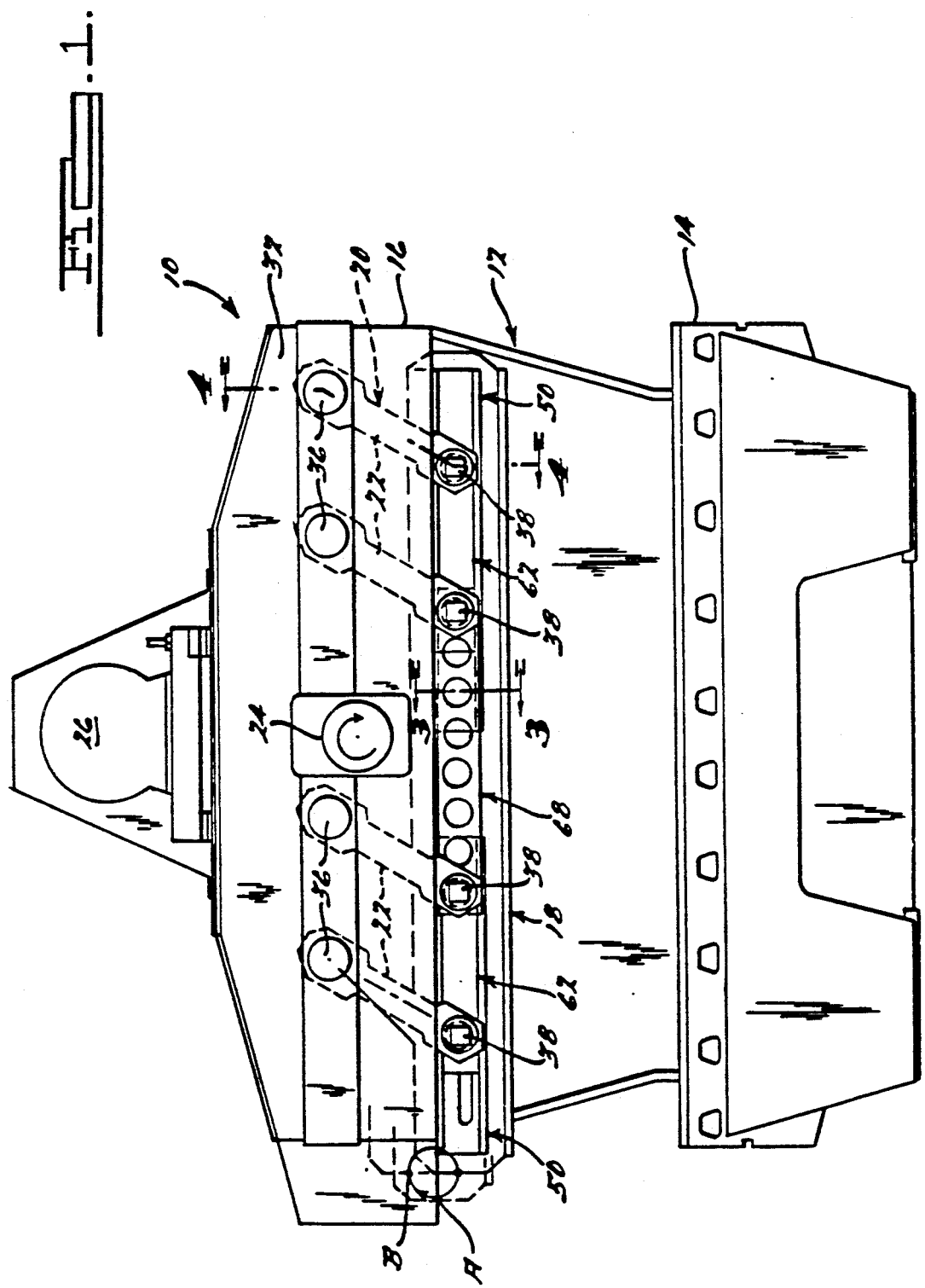

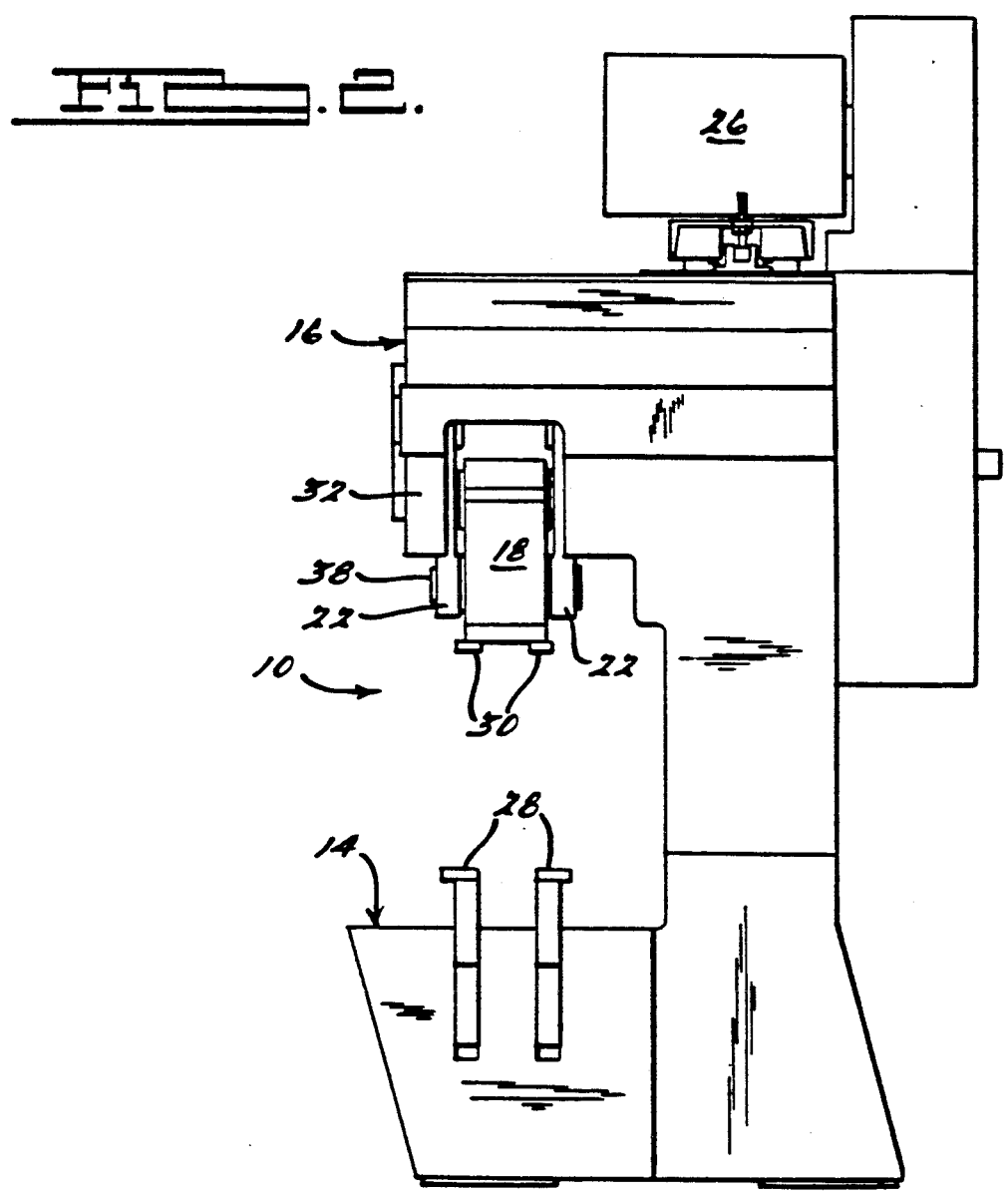
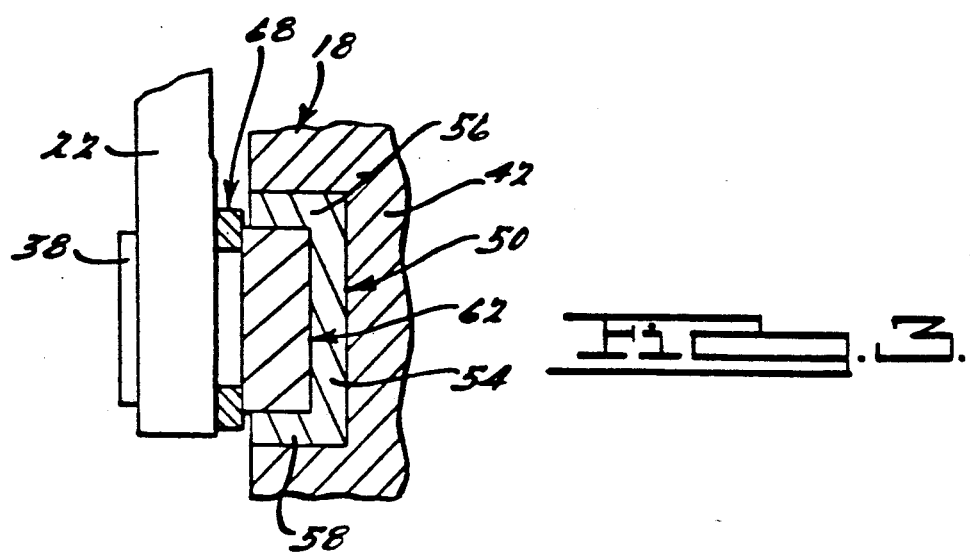

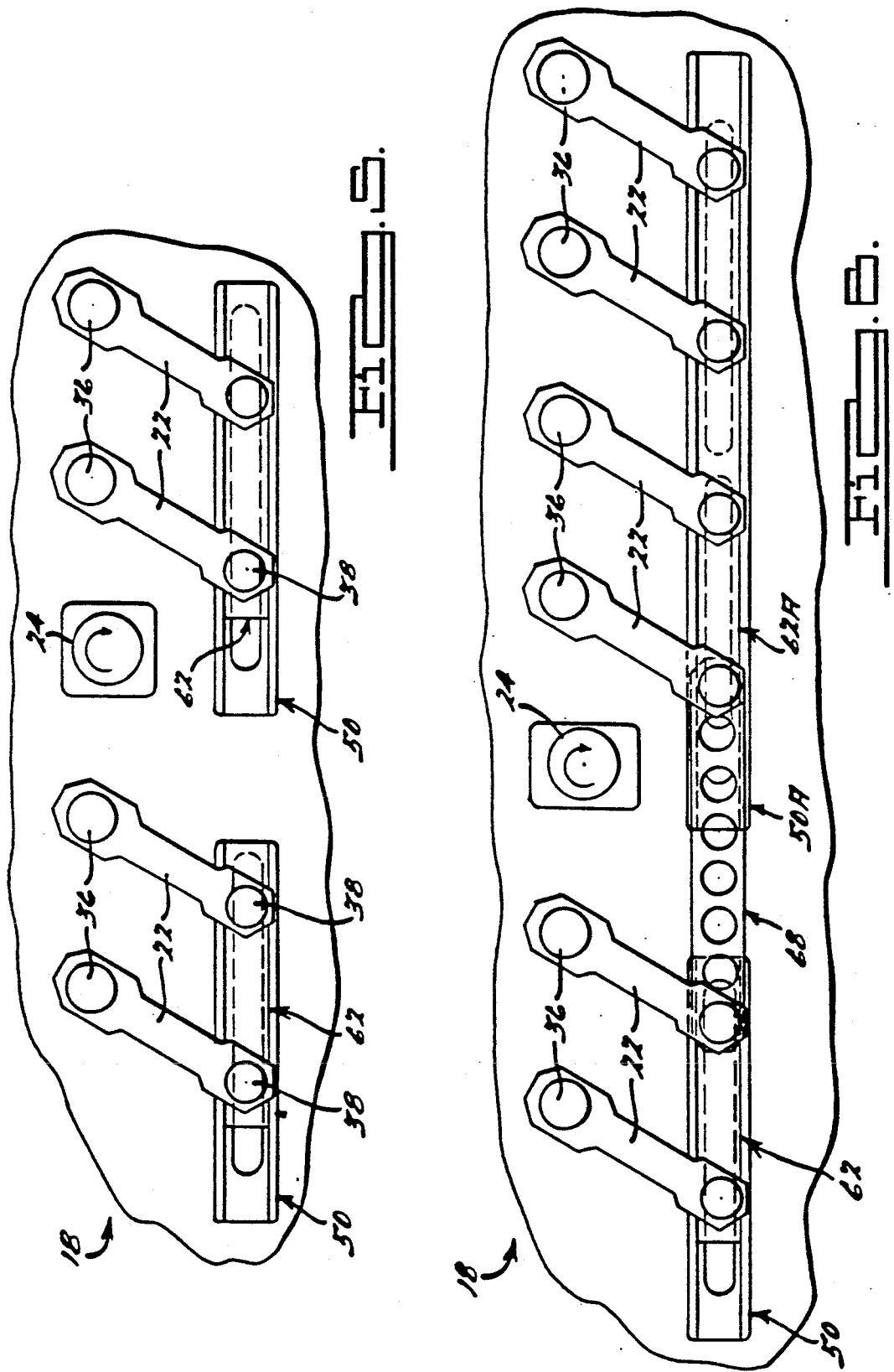

ROTARY ARC RAM

BACKGROUND AND SUMMARY OF THE INVENTION

This invention relates to improved apparatus of the rotary arc type for severing elongated material, such as round tubing, moving continuously of its length.

Rotary arc cutoff apparatus for severing metal tubing, roll-formed shapes and elongated extruded workpieces typically comprises a cutoff die set mounted for substantially linear reciprocating movement along tracks on the flat bed of a mechanical pres with a long, relatively heavy, ram moving with and causing a clamping and cutoff blade assembly associated with the die set to engage and sever the workpiece. A plurality of links are pivotably connected at their opposite respective ends to the press and the ram such that driving rotation of an eccentric crank connecting the ram to the press imparts swinging oscillatory motion to the ram whereby when the die set is accelerated up to that of the tube the cutoff blade reciprocates vertically relative to the die set.

In Borzym "Flying Cutoff Machine with Swinging Ram" U.S. Pat. No. 3,288,011 issued Nov. 29, 1966 the crank is pivotally connected to only one of the four links which connection limits the vertical rise of the ram. In general, the vertical rise of the ram correlates into longer strokes and greater tube diameters that can be cut. The length of the links would have to be increased to increase the tube diameters which can be cut. However, the driving connection between the crank and ram places a limit on the upward vertical movement of the ram and this limits the work that can be done. A ram which has greater vertical stroke and decreased inertia to allow for faster response in its stroke would be desirable.

In Riera et al. "Flying Cutoff Machine" U.S. Pat. No. 4,354,409 issued Oct. 19, 1982, specifically incorporated herein by reference, the ram is driven by a central crank assembly to impart an orbital movement to the ram and includes a slide member mounted thereto for sliding movement relative to the ram. Orbital movement of the ram permits cutting of heavier metals at higher speeds because the ram is traveling in the direction of the moving material during the cutting operation. Sliding contact between the metal surfaces over the entire stroke of the press causes high friction and inertia. Turning of the crank at very high RPM imposes a turning moment on the ram which can result in chattering effect wherein the ram experiences slight angular displacements along the ram longitudinal axis. As a result, available power to drive the ram may be consumed. It would be desirable to have a sliding connection between the link and ram which minimizes movement and friction which would correlate in a lower power required to move the ram in the orbital path. It would also be desirable to reduce the weight of the ram and its support apparatus whereby to further reduce the power required to drive the ram. The invention provides a ram assembly which has a faster response to its orbiting motion, and reduces power required to orbit the ram in parallel planes relative to a tube cutoff die set. The ram is constrained by a slide assembly for horizontal swinging movement without introducing wear on the ram. Without increase in link length, the present invention increases the vertical workstroke of the ram, to allow the severing of tubing having larger diameter and to increase the linear speed of th die relative to the longer bed.

Advantageously such a ram assembly would retrofit the prior cutoff machine of Riera et al. U.S. Pat. No. 4,354,409 without substantially redesigning same.

Other features and advantages of the present invention will become apparent from the following detailed description of the preferred embodiment of the invention taken in conjunction with the accompanying drawings.

BRIEF DESCRIPTION OF THE DRAWINGS

FIG. 1 is a front elevation view of a rotary arc ram tube cutoff machine embodying the invention with the die set therefor removed in the interests of clarity.

FIG. 2 is a side elevation view of the cutoff machine shown in FIG. 1.

FIG. 3 is a view taken generally along line 3—3 in FIG. 1 with portions broken away and removed.

FIGS. 5 and 6 show alternate embodiments in accordance with this invention.

DETAILED DESCRIPTION OF THE PREFERRED EMBODIMENT

Figure 4:
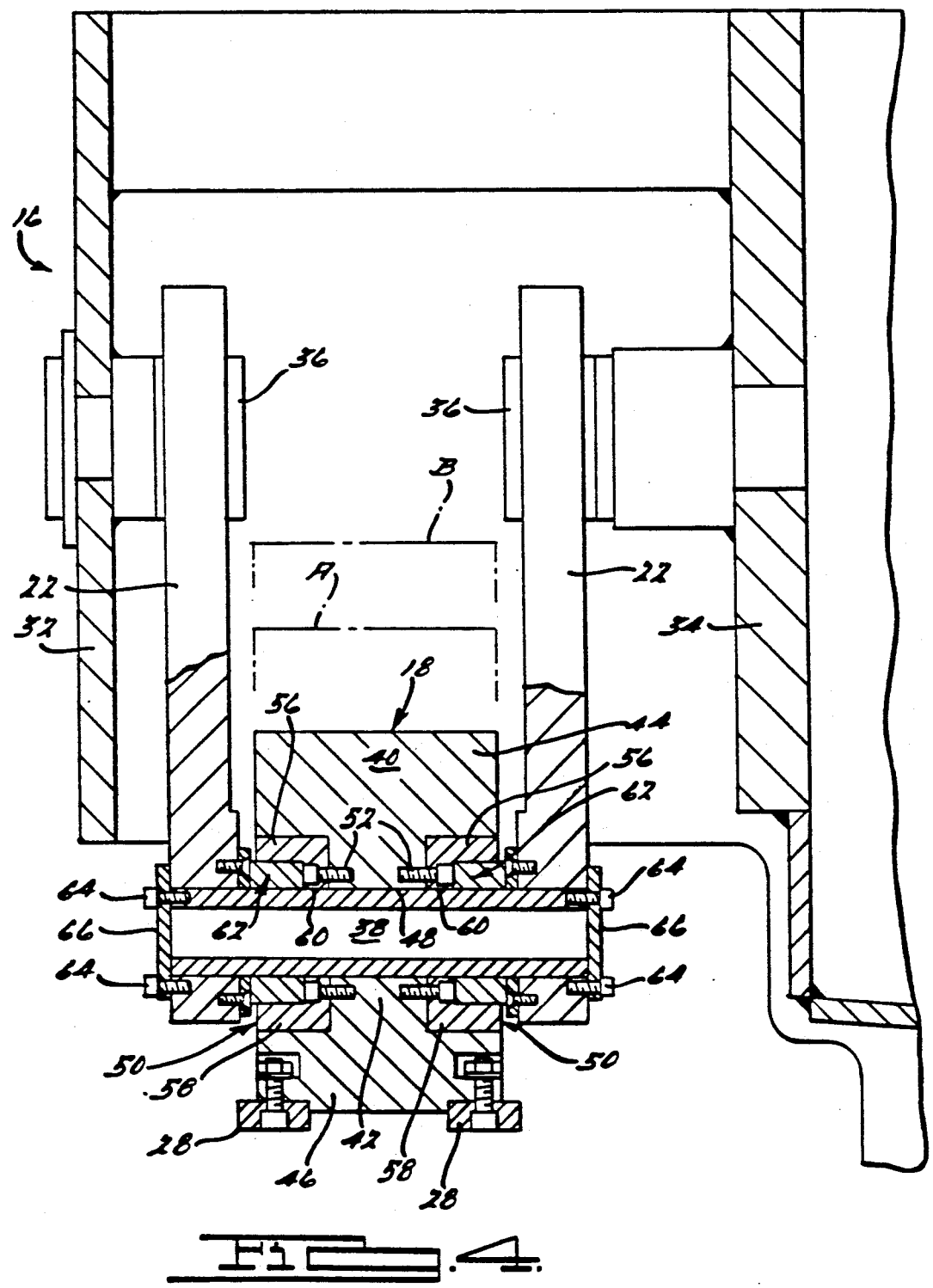
FIG. 4 is a view taken along line 4—4 in FIG. 1.

Referring now the drawings, a cutoff machine embodying the present invention is of the type disclosed in the Riera et al. patent and is for severing round tubing extending longitudinally of its axis and delivered continuously from a source such as a tubing machine, not shown, which would be located to the left of the machine as viewed in FIG. 1. Such tubing can have various shaped cross-sections such as a channel, a T-section or the like.

The machine is generally designated at 10 and includes a frame 12 having a flat bed 14 extending longitudinally and parallel of the path of the tubing to be cut and beneath the workpath thereof and a head 16 spacedly overhanging the bed and tube path, a ram 18 extending parallel to the path and above the bed, and a parallelogram linkage 20 including a plurality of links 22 for supporting the ram from the head and for translatory swinging movement toward and from the tube path about axes perpendicular to the path. An eccentric crank 24 connects the ram to the frame for rotary movement, the crank being driven by a motor 26 whereby the crank rotates the ram 360° about its connection to the head. FIG. 1 shows orbiting path of the ram with portions designated "A" and "B" showing the locations of the ram.

A die set (shown and described in the above patents) for clamping onto the tube and severing the tube is mounted to the frame for sliding movement by a pair of transversely spaced rails 28 forming part of the bed and a pair of transversely spaced flange bars 30 forming part of the ram. The die set slides relative to both the bed and the ram and at the same time the tube severing blade severs the tube into sections as the ram undergoes its orbital movement. The distance the die set moves is determined by the speed of movement of the tube and the time to reciprocate the blade.

The head 16 includes a pair of transversely, spaced head plates 32 and 34 that superpose bed 14. The head plates are spaced apart a distance sufficient to receive the parallelogram linkage 20 and the driving connection afforded by the eccentric crank. The ram 18 is connected to the linkage for swinging movement between the head plates. When the crank rotates 360°, this causes the ram to orbit 360° between and relative to the head plates.

The parallelogram linkage 20 is formed by a plurality of separate links 22 with a like set of links being connected to each side of the ram. Each link has an upper end and a lower end with the upper end portions being provided with an opening sized to pass a pivot pin 36 and be suitably connected to one of the head plates and the lower end portions being provided with an opening sized to pass a pivot pin 38 and be suitably connected to the ram. The pivot axes of the pivot pins 36 and 38 for the upper and lower ends of the links define, respectively, planes above the bed which are parallel and horizontal to one another and to a horizontal plane including the bed. An imaginary line drawn between the pivot axes of a link is always parallel to a like line drawn through each other link. That is, when the ram rotates the lines drawn through the pivot axes of each respective link are maintained at an acute angle to the bed. As shown in FIG. 1, the links move the ram upwardly to the left in oscillating between the first and second positions.

In accordance with this invention, ram 18 is longitudinally extending, symmetrical in cross-section about a central longitudinal axis, and is primarily comprised of a single material having a density substantially less than that of steel. Preferably the material would be nonferrous, and have a density about one third that of steel, aluminum being found to be suitable in one application. The ram is generally in the form of an I-beam 40 having a vertical web 42 connecting upper and lower flanges 44 and 46 A pair of oval, laterally spaced, longitudinally extending slots 48 pass through the web.

A plurality of C-shaped guide tracks 50 are fixedly mounted by fasteners 52 to the side channels of the I-beam. Each guide track has a flat body 54 and upper and lower track portions 56 and 58, the track portions of the "C" defining both a guide and a bearing surface Shown best in FIG. 3 body 54 has an oval slot 60 therethrough which is coextensive with and in register with one of the slots 48 in the I-beam web. Preferably, guide tracks 50 are comprised of a wear resistant material such as steel.

A generally flat, rectangular, longitudinally extending slide member 62 is slidably received in each guide track 50 with the opposite end portions of each slide member having an opening therethrough sized to pass a respective pivot pin 38 connected to the lower end of a respective link. The pivot pins 38 pass through the registered slots 60 and 48, are free to slide longitudinally of the ram 18 in the slots, and interconnect a pair of slide members 62, one slide member being on each opposite side of the ram. The slide members 62 are free to slide within the C-shaped guide tracks 50 with wear on the ram being obviated by the upper and lower track portions 56 and 58 thereof.

Shown best in FIG. 4, links 22 on each side of the ram 18 suspend the ram to the respective head plates 32 and 34 with rotation and vertical rise of the ram therebetween being shown by the dotted lines and corresponding to the ram locations "A" and "B" shown in FIG. 1. It can be seen that no structure impedes the vertical rise, and thus the workstroke, of the ram. The upper pivot pins 36 allow the upper ends of the respective links to pivot relative to the head plates. The lower pivot pin 38 is tubular and has its opposite end portions nonrotatably secured to a respective link 22 at each of its opposite sides by threaded fasteners 64 and mounting plates 66.

The ram in accordance with this invention is such that while the mass of the ram, including the guide tracks and slide members, can be generally numerically equal to the mass of the ram described in the Riera et al. patent, the mass moment inertia of the ram herein is much lower. As such, the torque needed to initiate rotation, and thus the associated power required to swing the ram is lower. As a further benefit, the ram can be made longer in length. Generally an axis through the mass center of the ram, in the long direction, is parallel to the geometrical axis through the cross-section.

The links 22 oscillate between first and second positions but because of the slide members 62 and their connection of the lower ends to the ram, the links do not undergo a 360° rotation. Driving movement of ram 18 causes the slide members 62 to have a horizontal vector of movement in a direction opposite to the horizontal vector of movement of the ram. At least two links 22 connect to each slide member 62 with multiple slide members acting to assure that the ram orbits in vertical planes relative to the bed.

FIG. 5 illustrates an embodiment in accordance with this invention including a pair of slide assemblies being disposed on opposite side of the driving connection afforded by the crank. The assemblies include the C-shaped guide track, the slide member and the connection to a pair of parallel links.

Further, in accordance with this invention and as shown in FIGS. 1 and 6, a link plate 68 is provided to connect the slide members together. When the ram is long and utilizes several laterally spaced parallelogram linkages 20, such link plate 68 connection will assure that the ram orbits smoothly in parallel planes without chattering, can reduce mass over that required by the single slide member of the hereinabove referenced Riera et al. patent, and reduces wear and/or friction. This construction also would help assure that when a ram has many links that the crank can operate to drive the ram. While a pin-like connection permitting rotation between the members is shown, a box-like connection which inhibits relative rotation between the connected members may be desirable.

In FIG. 6 embodiment, relative to the driving crank connection, the slide member 50A and associated guide track 62A shown to the right are longer than the slide member 50 and guide track 62 shown to the left.

While the above description constitutes the preferred embodiment of the invention, it will be appreciated that the invention is susceptible to modification, variation, and change without departing form the proper scope or fair meaning of the accompanying claims.

What I claim is:

1. In a cutoff machine including a blade for severing elongated material moving continuously in a path longitudinally of tis length, a frame having a base extending parallel to and beneath said path forming a bed for the machine and a head spacedly overhanging the base and said path; an elongated ram extending parallel to said base for actuating the blade; support means for supporting the ram for orbital movement above the bed, said support means including a plurality of links each said link having an upper end pivotally connected to the head and a lower end, and rotating drive means for causing the ram to orbit relative to said head, said support means characterized by a pair of slide members each being connected to said ram for relative horizontal sliding movement longitudinally of said ram, and said links having their respective lower ends pivotally connected to said slide members, wherein said plurality of links of said support means comprises a first pair and a second pair of links, the first pair of links being pivotally connected to the first slide member and defining a first parallelogram linkage and the second pair of links being pivotally connected to the second slide member and defining a second parallelogram linkage, said linkages being generally coplanar.

2. The cutoff machine as recited in claim 1 wherein each said link has an upper and lower pivot point and an imaginary line extending through its pivot points, the upper and the lower pivot points being disposed, respectively, in a first and second plane, said planes and said base being substantially parallel to one another and generally horizontally disposed, and each said imaginary line always being disposed at an acute angle relative to said base as the ram orbits vertically above and in parallel relation to said base, each of said imaginary lines always being substantially parallel to one another.

3. The cutoff machine as recited in claim 1 wherein the pivot points defined at the respective upper and lower ends of said links are disposed in respective horizontal planes each plane parallel to one another and a longitudinal axis through said path.

4. In a cutoff machine including a blade for severing elongated material moving continuously in a path longitudinally of its length, a frame having a base extending parallel to and beneath said path forming a bed for the machine and a head spacedly overhanging the base and said path; and elongated ram extending parallel to said base for actuating the blade; support means for supporting the ram for orbital movement above the bed, said support means including a plurality of links each said link having an upper end pivotally connected to the head and a lower end, and rotating drive means for causing the ram to orbit relative to said head, said support means characterized by a pair of slide members each being connected to said ram for relative horizontal sliding movement longitudinally of said ram, said links having their respective lower ends pivotally connected to said slide members, and connection means disposed through the ram for connecting the slide member together, wherein said connection means comprises a link plate having opposite end portions connected, respectively, to one and the other slide member.

5. The cutoff machine as recited in claim 4 wherein the slide members are generally flat plates having opposite end portions which have an opening therethrough for receiving a pivot pin.

6. The cutoff machine as recited in claim 4 wherein said support means is characterized by a first and second guide channel in said ram, and a guide track mounted in each said guide channel, each said guide track extending generally longitudinally and receiving a respective slide member.

7. The cutoff machine as recited in claim 6 wherein said guide tracks and slide members are configured such that the pivot points of the respective upper and lower ends are in respective horizontal planes which are parallel to and vertically spaced from the tube path.

8. The cutoff machine as recited in claim 6 wherein said guide tracks are comprised of a relatively hard wear resistant material.

9. The cutoff machine as recited in claim 8 wherein said ram is comprised of a nonferrous material and said guide tracks are comprised of a wear resistant material.

10. The cutoff machine as recited in claim 8 wherein said ram is comprised of aluminum and said guide tracks are comprised of a wear resistant steel.

11. The cutoff machine as recited in claim 6 wherein said support means is further characterized by a guide groove, an elongated slot is defined between one of the guide channels and said guide groove, and the pivot pin connected to said slide members extends through the slot.

12. The cutoff machine as recited in claim 11 wherein said ram is generally in the shape of an I-beam having two elongated sides, the guide tracks are in the form of a C-shaped section received in the opposite side channels of the I-beam, and the same number of links are on each of the sides of the beam to connect to respective slide members received in the guide tracks.

13. The cutoff machine as recited in claim 4 wherein said ram is comprised of a metal having a density which is approximately one-third that of steel whereby the length of said ram can be both greater in length than yet weigh numerically equal to or less than a shorter lengthed ram comprised of steel.

14. The cutoff machine as recited in claim 4 wherein said head includes a pair of laterally spaced vertical supports, said drive means includes an eccentric crank mounted for orbiting movement above said path and operatively connecting the frame to said ram, further characterized in that when said eccentric cam rotates the ram 360° in horizontal planes and within the space between said supports said slide members move oppositely of the ram.

15. The cutoff machine for severing elongated material moving continuously longitudinally of its length in a horizontal path, including an elongated frame having a head spaced from a base, and a ram mounted for orbiting movement over said base, said machine further characterized by said ram extending longitudinally and being comprised of a metal and density of which is substantially less than that of steel, a pair of laterally spaced longitudinally extending guide rails comprised of a wear resistant material substantially harder than that of said metal, a pair of slide members, each having a length substantially less than the length of said ram and one being disposed in each respective said guide rail for longitudinal sliding movement, a first and second parallelogram link assembly connecting, respectively, one and the other of said slide members to said head, said link assemblies being coplanar, and drive means, including an eccentric crank disposed between said link assemblies and connected to said ram, for driving said ram.

16. The cutoff machine as recited in claim 15 further characterized by connection means, including a link plate having opposite end portions, for interconnecting each of said slide members for sliding movement.

17. The cutoff machine as recited in claim 16 wherein said opposite end portions are pivotally connected to a pivot pin of a link of each slide member.

18. The cutoff machine as recited in claim 15 including a plurality of separated parallel links pivotally connecting the slide members to the ram, the links forming a parallelogram linkage with the ram and a line formed by the link connections to the machine.

19. In a machine for severing an elongated workpiece into selected lengths and of the type including a frame having a base disposed generally horizontally and upon which the workpiece moves longitudinally of itself, a parallelogram linkage suspending an elongated ram to the frame such that said ram is always disposed generally horizontally to and in a plane substantially parallel to said base, and an eccentric cam for driving the ram vertically toward and away from the base, characterized in that said ram is comprised of a first material having a density which is substantially less than that of steel and includes a pair of longitudinally extending slide assemblies spaced longitudinally apart, said slide assemblies being coplanar and each said slide assembly including a guide member and a slide member mounted for sliding movement in the guide member, said guide members being comprised of a second material more resistant to wear than said first material, said slide members being connectable to the parallelogram linkage such that said slide members travel in opposite longitudinal directions as the ram reciprocates.

20. In a machine for severing an elongated workpiece into selected lengths and of the type including a frame having a base upon which the workpiece moves longitudinally of itself, and a parallelogram linkage suspending an elongated ram to the frame such that said ram is extending parallel to the base and orbitally movable toward and away from the base by an eccentric cam, characterized in that said ram is comprised of a first material having a density which is substantially less than steel and includes a plurality of longitudinally extending slide assemblies, each slide assembly including a guide member and a slide member mounted for sliding movement in the guide member, said guide members being comprised of a second material more resistant to wear than said first material, said slide members being connectable to the parallelogram linkage such that said slide members travel in opposite longitudinal directions as the ram reciprocates, and including connecting means for interconnecting adjacent slide members.

21. The machine as recited in claim 20 wherein the slide members are generally flat and generally rectangular in shape with end portions of adjacent slide members being interconnected by a lock plate.

22. A ram adapted to be suspended by a parallelogram linkage to a cutoff machine so as to be orbitally movable toward and away from an elongated workpiece while the workpiece is moving along a path on the machine, said parallelogram linkage being characterized by coplanar first and second parallelogram linkage assemblies, said ram being characterized by an elongated prismatic member that extends between opposite longitudinal ends thereof and has a cross-section which is generally uniform and symmetrical about a geometrical axis that passes through said cross-section, said prismatic member being comprised of a material that is substantially less dense than that of steel and has a mass center generally disposed on said geometrical axis, a pair of slide members, and a pair of laterally spaced elongated guide members rigidly secured to the ram for guiding and supporting a respective slide member for horizontal sliding movement therewithin, each slide member being connectable to a respective of one said linkage assembly, and said guide members assuring that the ram is maintained parallel to and movable in a direction vertically towards and away form the workpiece.

23. The ram as recited in claim 22 wherein each said guide member comprises an upper and a lower guide track at least one track of each pair being of a hard wear resistant material.

24. The ram as recited in claim 22 wherein the guide members each comprise an elongated C-shaped section including a central body and an upper and a lower flange for engaging the respective top and bottom edges of the slide member.

25. The ram as recited in claim 24 wherein said ram is generally I-shaped in cross-section with the guide members being fixedly mounted in opposed recesses of the I.

26. The ram as recited in claim 24 wherein the respective pairs of C-shaped sections and associated slide members are different in length.

* * * * *